United States Patent [19]
Salihbegovic et al.

[11] 3,880,348
[45] Apr. 29, 1975

[54] VARIABLE STRUCTURE ADAPTIVE CONTROLLER

[75] Inventors: Adnan Salihbegovic; Bozidar Matic; Svetozar Zimonjic; Faruk Hadziomerovic, all of Sarajevo, Yugoslavia; Alexandr Michailovich Shubladze, Moscow, U.S.S.R.; Alexei Pavlovic Okunev, Moscow, U.S.S.R.; Stanislav Vasilyevich Yemeljanov, Moscow, U.S.S.R.; Nataly Yevgenyevna Kostyleva, Moscow, U.S.S.R.

[73] Assignees: Energoinvest-Istrazivacko-razvojni Centar za automatiku, Sarajevo, Yugoslavia; IAT-Institut po problemom upravlenia, Moscow, U.S.S.R.

[22] Filed: June 3, 1974

[21] Appl. No.: 476,036

[52] U.S. Cl. ............................................. 235/150.1
[51] Int. Cl. ...................... G05b 17/02; G05b 13/02
[58] Field of Search ................................. 235/150.1

[56] References Cited
UNITED STATES PATENTS
3,701,889   10/1972   Barron et al. .................... 235/151.1

Primary Examiner—Eugene G. Botz

[57] ABSTRACT

A variable structure adaptive controller is provided. It includes a basic circuit for the preparation of information and an adaptation circuit which is coupled to the basic circuit and provides for the adaptation of multiplication coefficients as a function of the derivation value between the values of an error signal and the differential of this error signal. The circuits provide for a very wide range of changes in parameters and for compensating the variations of these parameters. The basic circuit includes an input terminal with a multiplier-divider circuit coupled to the same, there being a circuit providing the function $TP/\tau P+1$ and two output terminals one of which is connected directly and the other through the latter said circuit to the input terminal. A further output terminal is connected to the multiplier-divider circuit. The adaptation circuit includes two parallel circuits connected respectively to the two aforementioned output terminals and a dividing circuit connecting these two parallel circuits to the multiplying divider circuit.

18 Claims, 7 Drawing Figures

VARIABLE STRUCTURE ADAPTIVE CONTROLLER

FIELD OF THE INVENTION

This invention relates to process control equipment for use in various fields of industry and more particularly in power plants, refineries, chemical plants and so on.

BACKGROUND

A variable structure adaptive controller is a means for controlling process variables such as temperature level, flow, pressure, and so forth in various industrial plants. An adaptive controller is that part of a closed feedback loop that also includes a sensor to obtain information as to the value of the controlled process variable and an actuator or final control element that moves a valve or the like and thereby performs a control action over a controlled object such as a boiler, turbine, distillation column, chemical reactor or the like.

A main task of the controller within the control loop is to maintain a controlled variable at some desired or set value determined by process requirements. In general, the control law that is mostly used in standard controllers involves a linear proportional-integral-derivative (three term PID controllers) control action. Some attempts have been made in the field of more complex control laws (algorithms) including algorithms with a certain degree of adaptation of gain (proportional action) within the above-mentioned three term controllers.

SUMMARY OF THE INVENTION

Basically, the variable structure adaptive controller of the invention belongs to the aforenoted class of adaptive systems, and it is an object of the invention to provide improvements in how adaptation is performed.

It is a further object of the invention to provide improvements in the automatic control of process variables.

Further, it is another object of the invention to provide the ability to change gain automatically (proportional action) and to adapt in such a way as to counteract changes which may occur in process parameters (static gain or time constant of process within the control loop).

Yet another object is to amplify the field of successful application of variable structure adaptive controllers so that they have a wider application than that of standard three term controllers.

For example, the change of load or throughput might require a change in set value of the controller. In most cases, due to the non-linear static characteristics of the controlled processes, the controller settings of the standard type of controllers should be retuned to match the new values of the process parameters (static gain or time constants). This is undesirable. The adaptive controller of the invention avoids the problem for it adapts automatically and preserves control quality even in the presence of disturbances that a standard three term controller cannot overcome.

Furthermore, the adaptive controller of the invention can be used with a very wide class of processes that involve the presence of noise in the related control loop. The performance of the variable structure adaptive controller is also dominantly better in such control loops compared to that of standard types of process controllers.

To achieve the above and other of the noted objects of the invention, there is provided a variable structure adaptive controller for compensating variations of gain and/or time constant parameters of an apparatus or process to be controlled, said controller comprising basic circuit means for the preparation of error information and an error signal and an adaption circuit means which is coupled to said basic circuit means and provides for the adaptation of multiplication coefficients as a function of the derivation values of the error signal and of the differential of this error signal, said circuit means providing for compensating the variations of said parameters in a very wide range of change therein.

The basic circuit means may include an input terminal, multiplication means coupled to said input terminal, further means providing a function of $TP/\tau P+1$, two output terminals, one of which is connected directly and the other through said further means to said input terminal, and a further output terminal connected to said multiplication means.

In accordance with a feature of the invention, the adaptation circuit means may comprise first means coupled to the basic circuit means to determine an error signal from a standard set signal and a variable signal generated by the apparatus or process to be controlled.

According to a further feature, the adaptation circuit of the invention may comprise differentiation means coupled to said first means for generating a signal representing a derivative of said variable signal.

According to still another feature of the invention, the adaptation circuit may include absolute value circuit means coupled to said first and differentiation means to generate signals representing absolute values of the error signal and the derivation of said variable signal.

According to still a further feature of the invention, there may be provided a memorizing circuit means coupled to said first and differentiation means to memorize the signals generated by the latter, said memorizing circuit means including means to memorize maximum values of the signals received from the differentiation means.

The memorizing circuit of the invention may advantageously include means to establish a time constant for the memorizing circuit during which the aforesaid maximum values are memorized.

Further, in accordance with the invention, there may be provided multiplier-divider means coupled to memorizing circuit means to operate on the maximum value signals, said multiplier-divider means including a pulse width modulator coupled by the absolute value circuit means to said differentiation means and generating a signal representing a denominator of an adaptation coefficient.

Still further, the multiplier-divider means may include an amplitude limiter coupled to said pulse width modulator to generate a signal representing the numerator of said coefficient.

The above and other objects, features and advantages of the invention will be more apparent from the detailed description which follows hereinafter.

DETAILED DESCRIPTION

The regulator or adaptive controller of the invention consists of a basic circuit I and an adaptation circuit II which adapts the multiplication coefficients. This arrangement will be first discussed relative to FIG. 1 and will later be described in greater detail.

Figure 1:
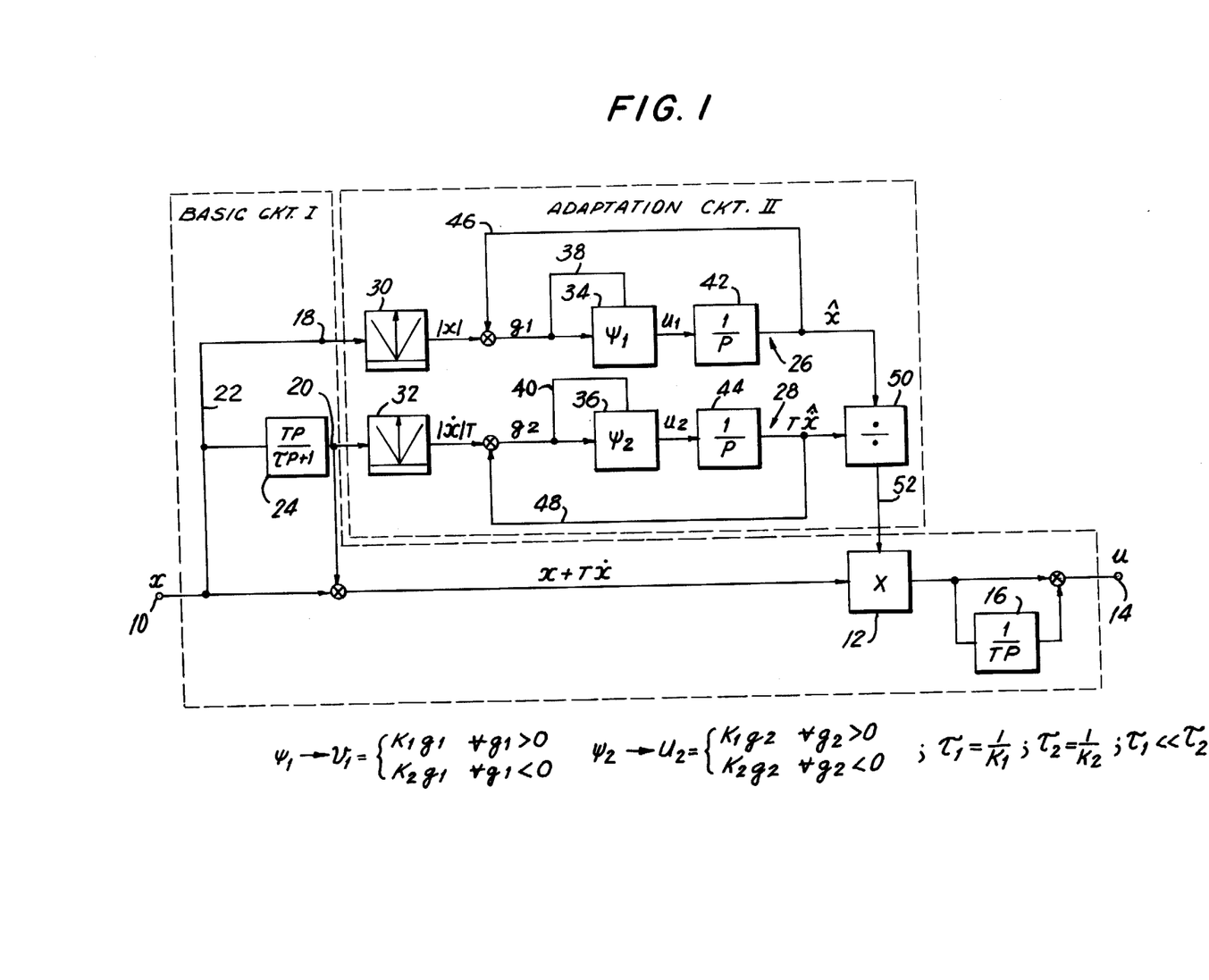
FIG. 1 is a block diagram of an adaptive controller provided in accordance with the invention.

The basic circuit has, for example, the following control function:

$$U = k(2x + T_\mu \dot{x} + (1/T_\mu) \int x)$$

where the elements of the function are:

$x$ — regulation error signal entering the regulator, $k$ — regulation multiplication coefficient which is changed in circuit II.

Coefficient $k$ can be defined as:

$$k = \hat{x} / \hat{\dot{x}}$$

where:

$\hat{x}$ — is the maximum value that error $x$ can take, and $\hat{\dot{x}}$ — is the maximum value that the differential derived from error $x$ can take.

The derivation of signals $x$ and $\dot{x}$ can be achieved by the use of a certain dividing circuit, the output signal of which defines the multiplication coefficient $k$.

The circuit in which the signal $x$ is formed may be described by the following function:

$$\tau_1 \dot{\hat{x}} + \hat{x} = |\dot{x}| \text{ for } |x| > \hat{x}$$
$$\tau_2 \dot{\hat{x}} + \hat{x} = |x| \text{ for } |x| < \hat{x}$$

in which system $\tau_1 << \tau_2$. The value of $\tau_2$ has to be defined in such a manner that value of signal $x$ has minimal changes during the whole operation.

With reference to FIG. 1, there is, as has been noted above, a basic circuit I and an adaptation circuit II. The basic circuit includes an input terminal 10 at which is received an error signal. The basic circuit furthermore includes a multiplication circuit 12 and an output terminal 14 at which is produced the desired output signal. Moreover, there is provided a shunting circuit 16 in which provided the signal function 1/TP.

In addition to the aforesaid, the basic circuit I includes two output terminals 18 and 20, one of which is connected directly via line 22 to the input terminal 10 and the other of which is connected via a circuit 24 which provides the function TP/τP+1.

The adaption circuit II includes two parallel circuits 26 and 28, both of which are similar and include parallel circuits 30 and 32 by means of which the functions $|x|$ and $|\dot{x}|T$ are derived. These being converted respectively to $g_1$ and $g_2$.

The circuits 26 and 28 moreover lead to circuits 34 and 36, wherein the functions $\psi_1$ and $\psi_2$ are provided converting the signals respectively to $u_1$ and $u_2$. It will be noted that signals $g_1$ and $g_2$ are fed directly into circuit 34 and 36 and also indirectly via lines 38 and 40.

Signals $u_1$ and $u_2$ are fed into circuits 42 and 44 which provide the functions $1/P$ and $1/P$ so that at the outputs of the circuits are provided the signals $\hat{x}$ and $T\hat{\dot{x}}$, these signals being fed back to a prior portion of the circuit via feedback lines 46 and 48.

Signals $\hat{x}$ and $T\hat{\dot{x}}$ are fed into a dividing circuit 50 which is connected via line 52 to the multiplying circuit 12 of the basic circuit I.

Figure 2:
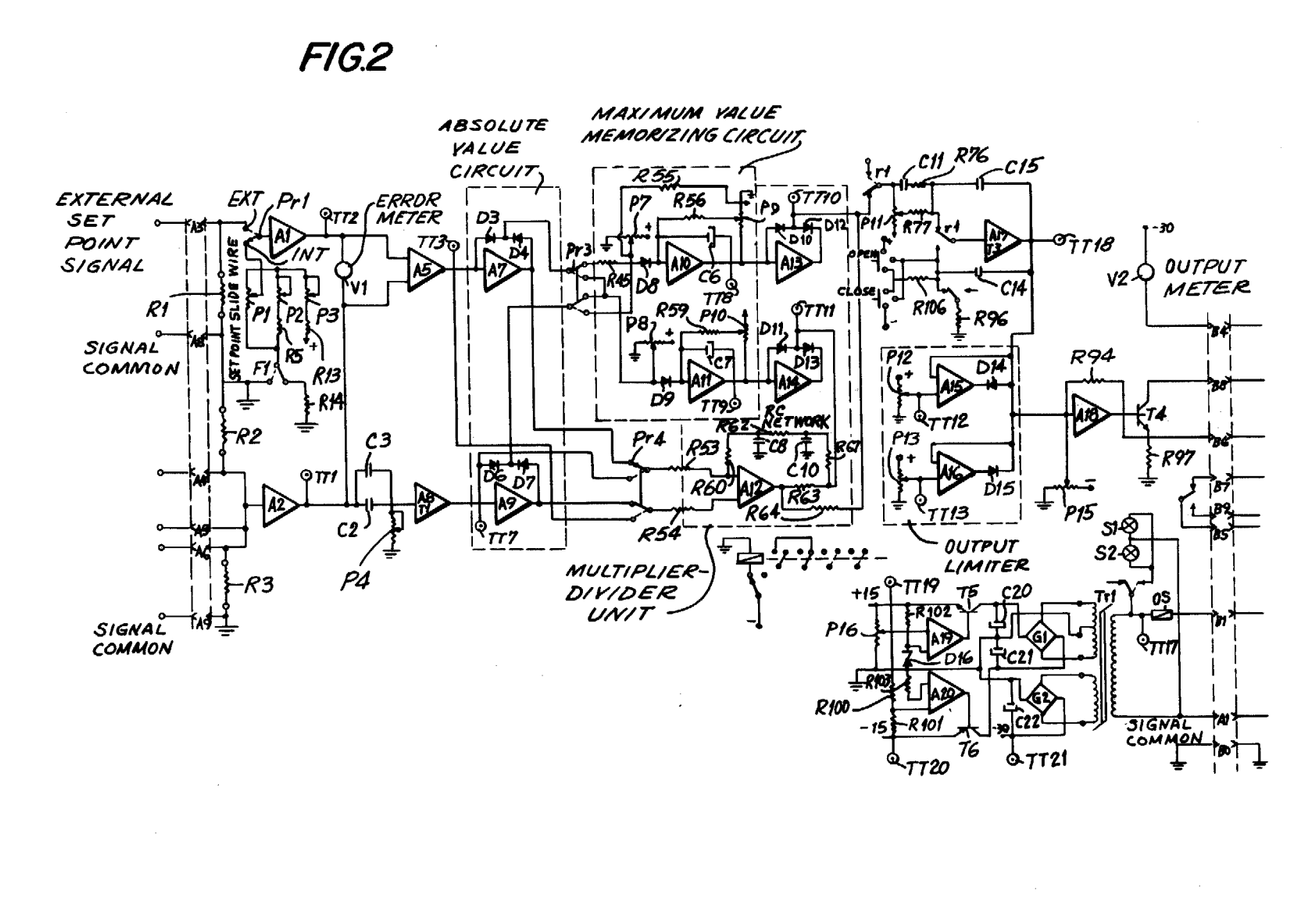
FIG. 2 is a schematic diagram of the adaptive controller of the invention.

A simplified schematic diagram of the controller of the invention is shown in FIG. 2. An input signal (controlled variable) is applied to the inverting input terminals of an amplifier A2. In case an error signal is calculated from several input signals (i.e. two or three component control), amplifier A2 enables the summing or subtracting of up to three standard signals (4–20mA or 0–20mA).

A second input signal is applied as an external set point value to the high-impedance non-inverting input terminals of an amplifier A1. At the input of amplifier A1 is located a conversion resistor P1 for conversion of a standard 4–20mA or 0–20mA current signal into a voltage signal of 0.5 – 2.5V or 0–2.5V.

When a switch Pr is in the EXT position, the input of amplifier A1 is connected to the input terminal A3 of the connector to which the external set point signal is applied. When the switch Pr1 is in position INT the set point slide wire potentiometer P1 is connected to the input terminal of amplifier A1.

The set point slide wire resistor P1 is connected in a network that includes potentiometers P2 and P3 for the calibration of span for internal setpoint value and also a jumper F1 for the selection of one of two input signal ranges of internal set point value, for example, 0.5 – 2.5V (4–20mA) and 0–2.5V (0–20mA).

The set point deviation meter V1 is connected between the outputs of amplifiers A1 and A2 and indicates the difference (to ± 20%) between the process variable signal and the internal or external set point signal. This difference signal is applied to the input differential amplifier A5. At the output of this amplifier appears error signal ($\epsilon$) as the difference between set point value $x_z$ and process variable ($x$) : $\epsilon = (x_z - x)$.

The output of amplifier A2 (process variable $x$) is also connected to a differentiating circuit, consisting of amplifier A8 and MOS FET transistor T1, that provides very high input resistance needed for the differentiator circuit.

A potentiometer P4 constitutes an input element with respect to the FET transistor T1 and appears as a tuning element for the adjustment of the quality of the controller's response within the control loop.

The output signals of amplifiers A5 (error signal $\epsilon$) and A8 (derivative $\dot{x}$ of process variable $x$) are fed to module circuits for extraction of the absolute values of these signals, $|\epsilon|$ and $|\dot{x}|$. These circuits are based on amplifiers A7 and A9 and their output signals are proportional to the values $|\epsilon|$ and $|\dot{x}|$.

These two circuits are part of the adaptation block that also includes "memorizing" circuits built on amplifiers A10 and A11 with the required input and feedback impedance elements.

Voltage signals at the outputs of these amplifiers are proportional to the maximum value of the input signal $|\hat{\dot{x}}|$ and $|\hat{\epsilon}|$ (depending on the position of the switch Pr3 for the choice of the adaptation algorithm). This selection and memorizing of the maximum values lasts during the time interval determined by the time constants of the "memorizing" circuits (depending on the position of the wipers of the potentiometers P9 and P10 situated on a common shaft together with the potentiometer P11 for adjustment of reset time). The output signals proportional to the "memorized" maximal absolute value of the error signal $|\hat{\epsilon}|$ and the absolute value of the derivative of process variable $|\hat{x}|$ are summarized with the values set by the potentiometers P7 and P8. These voltage signals are furthermore fed to the multiplier-divider unit based on the amplifiers A12, A13, and A14. The bias voltage set by potentiometers P7 (coefficient $\alpha$) and P8 (coefficient $\beta$) are needed to provide correct operation of the multiplier-divider unit for small input signals (i.e., for small values of the signals $|\hat{\epsilon}|$ and $|\hat{x}|$) in cases when a new stationary state has been reached and persists within the control loop (error signal $\epsilon$ reduced to zero and also $\dot{x} = 0$).

A multiplier-divider unit is employed which is based on pulse width modulator including an RC network coupled to the operational amplifier A12 and two amplitude limiters. One of these amplitude limiters includes amplifier A14 and modulates the intensity of feedback within the pulse width modulator circuit determining in that way the value of the denominator of the adaptation coefficient. The other amplitude limiter includes amplifier A13 and modulates the magnitude of square wave pulses at the output of the multiplier-divider unit and defines the numerator of the adaptation coefficient.

At the input of the pulse width modulator are applied the error signal and the derivative of the process variable $\dot{x}$. Their polarity is determined by the position of the switch Pr4 that enables a change of sign within the closed control loop. Hence, by a simple change of position of this switch, a necessary negative feedback loop can be readily and easily established.

At the output of multiplier-divider unit (e.g., at test point TT10) appears a train of pulses whose mean value is proportional to:

$$(|\hat{\epsilon}| + \alpha/|\hat{sx}| + \beta)(\epsilon + T_d sx)$$

where $s$ is a complex Laplace operator and $T_d$ is the time constant of the differentiating circuit.

When the switch Pr3 is in the second possible position, the signal at test point TT 10 is proportional to:

$$(|\hat{sx}| + \beta/|\hat{\epsilon}| + \alpha)(\epsilon + T_d sx)$$

The output signal from the adaptation block (comprising the described circuits for obtaining the absolute values and memorizing them, as well as the multiplier-divider unit) is applied to the function generator circuits that include MOS FET transistor T3 and amplifier A17.

The impedance elements in the input and feedback paths of the amplified provide the proportional signals (C11/C15) and reset $\omega/R77\ C15\ s : 0 \leq \omega \leq 1$ Following this, at the output of the amplifier A17, the signal is approximately proportional to the expression $z \approx k\ (|\epsilon| + \alpha/|sx| + \beta)(1 + (T_d/T_i))\ \epsilon + T_d\ s\ \epsilon + (\epsilon/T_i s)$
$z \approx k\ (|sx| + \beta/|\epsilon| + \alpha)(\ 1 + (T_d/T_i))\ \epsilon + T_d s\ \epsilon + (\epsilon/T_i s)$ Since the signal at the input of the function generator circuit is in the form of pulses, in series within the input path of the proportional action is inserted a resistor R76 to provide a low pass filter circuit (R76-C11). Reset action (P11-R77-C15) provides this filtration automatically.

The output of amplifier A17 is also applied to two controller output limiting circuits. These two circuits limit maximum (by means of potentiometer P12) and minimum (by means of potentiometer P13) value of the signal connected to the voltage-to-current convertor based on amplifier A18 and transistor T4. From output transistor T4 flows an output current in a range of 4–20mA (or 0–20mA) to a final control element (not shown).

When the controller is in the manual mode of operation, relay r1 is deenergized, connecting an integrating circuit including capacitor C14 to MOS FET transistor $T_3$ and amplifier A17. This capacitor is previously charged through resistor R96 to the magnitude of the voltage at the output of amplifier A17 before the transfer operation.

Owing to this, when transferring the controller from automatic to manual mode of operation, no change in the controller's output signal will be registered (bumpless transfer). When pressing pushbuttons on, for example, the front panel of the controller, positive or negative voltage is applied to the circuit causing the output to ramp up or down.

Figure 6:
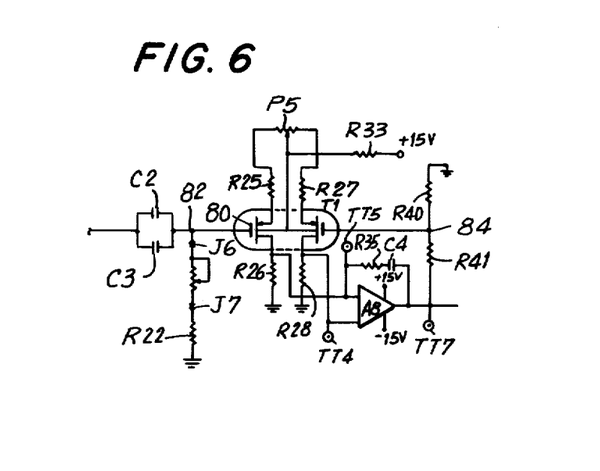
FIG. 6 is a detailed schematic diagram of part of the adaptive controller circuit of the invention.

As stated above, the adaptation block consists of two circuits for the extraction of absolute values, two memorizing circuits, a differentiator and a multiplier-divider unit (see also FIG. 6).

The amplifier A7 and two diodes D3 and D4 are parts of the basic configuration of a circuit whose output signal is always at a positive polarity regardless of the polarity of the input error signal. Similarly, the circuit having at its output the absolute value of the derivative of the process variable is based on the amplifier A9 and two diodes D6 and D7.

The described absolute value (module) circuits are necessary, for the multiplier-divider unit has a one-quadrant operating characteristic. The output signals of the absolute value circuits are applied, through the switch Pr3 that enables a change of the adaptation algorithm, to the maximum value memorizing circuits based on the amplifiers A10 and A11.

The mode of operation of these circuits is as follows: The input signal into this circuit is always positive and when increasing passes to the output amplified by a coefficient determined by the resistance ratio R55/R45. Capacitor C6 charges to the magnitude of the output signal, if the input signal has negative derivative (i.e., it is decreasing). Diode D8 becomes negatively biased and disconnects the feedback loop containing resistor R55.

Within the feedback loop around the amplifier A10 is capacitor C6 that discharges through resistor R56. The memorizing time constant is given by $R56 C6/\gamma$ where $\gamma$ changes between 0 and 1 as set by potentiometer P9. Briefly, this circuit may be described by following functions:

$\tau_1\ \hat{\epsilon} + \hat{\epsilon} = |\epsilon|$ for $|\epsilon| > \hat{\epsilon}$ $\tau_2\ \hat{\epsilon} + \hat{\epsilon} = |\epsilon|$ for $|\epsilon| < \hat{\epsilon}$ where $\tau_1 << \tau_2$ ; and
$\tau_2 = R56\ C6/\gamma$ ;
$0 \leq \gamma \leq 1$
$\tau_1 = R55\ C6$ By means of potentiometers P7 and P8, the bias voltages (coefficients $\alpha$ and $\beta$) are set to provide correct operation of the multiplier-divider unit around zero magnitudes of the error signal and the derivative of process variable $\dot{x}$.

The multiplier-divider unit comprises the pulse width modulator based on the amplifier A12 with the passive RC network in the feedback loop around this amplifier, and the two magnitude modulators. A simplified block diagram of this appears in FIG. 3.

The pulse width modulator has at its output a train of square wave pulses (see FIG. 4) with a magnitude equal to the saturation voltage of the amplifier A12. The mean value of these pulses is proportional to the magnitude of the input signal.

Figure 3:
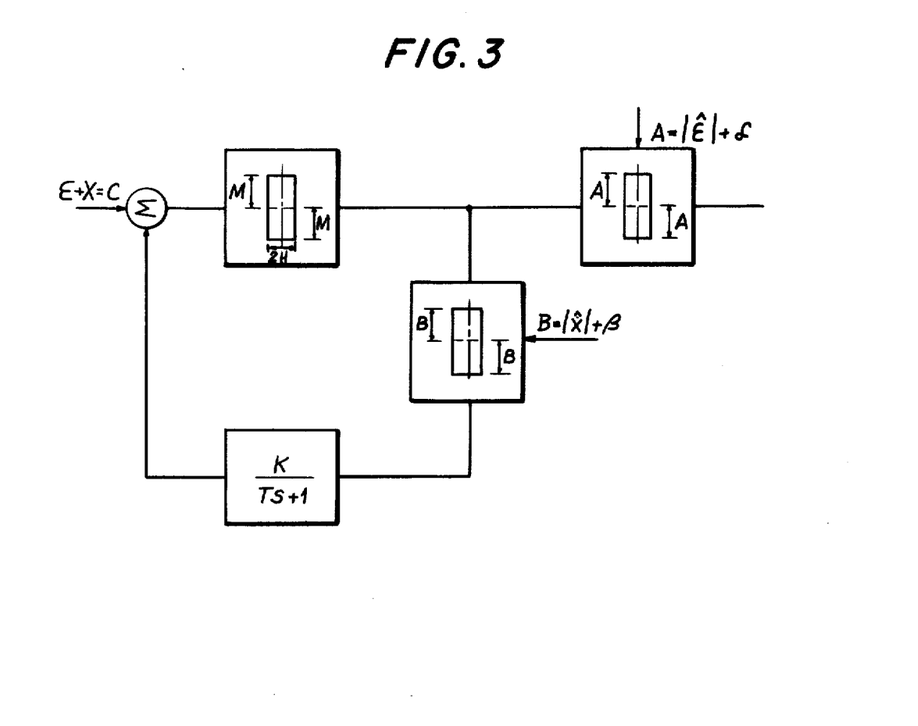
FIG. 3 is a block diagram of a multiplier-divider unit used in the circuit of FIG. 2.

Within the feedback loop of amplifier A12 is, as stated above, the passive RC network, whose input signal is modulated to the magnitude determined by signal $B = |\dot{x}| + \beta$ (for adaptation algorithm $|\dot{\epsilon}|/|\dot{x}|$).

The output signal of the pulse width modulator is applied to the second magnitude modulator that limits output magnitude to the value $$A = |\dot{\epsilon}| + \alpha$$

Figure 4:
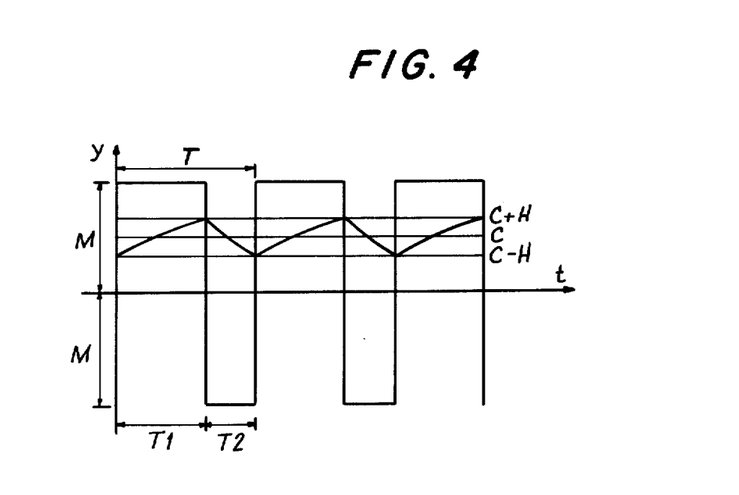
FIG. 4 is a wave form chart of a pulse width modulator used in the circuit of FIG. 2.
Figure 5:
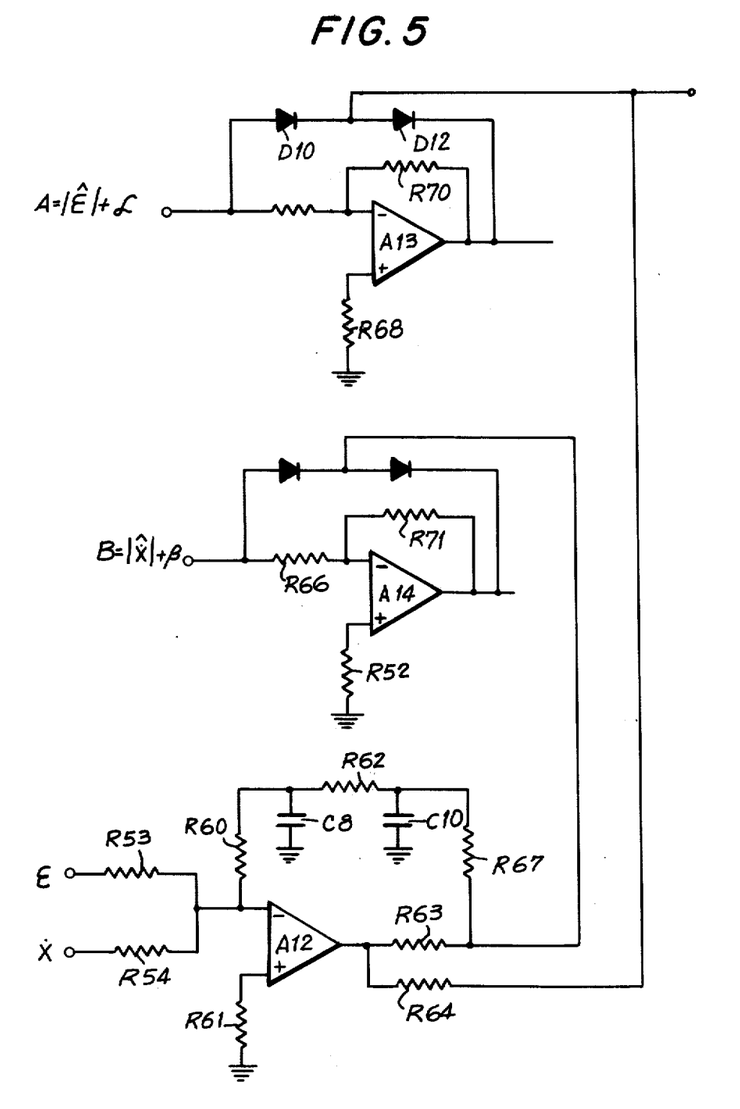
FIG. 5 is a schematic diagram of the multiplierdivider unit.

The output signal of the pulse width modulator is depicted in FIG. 4. A detailed circuit diagram of multiplierdivider unit is shown in FIG. 4.

It is easily shown that $$T1 = T\ (2H/kB - A)$$
$$T2 = T\ 2H/kB + A$$

The mean value of the output signal y is under certain assumptions $$y_M = \frac{T1C - T2C}{T1 + T2} = \frac{T\frac{2H}{kB-A}C - T\frac{2H}{kB+A}C}{T\frac{2H}{kB-A} + T\frac{2H}{kB+A}} = \frac{2AC}{2kB} = \frac{1}{k}\frac{AC}{B}$$

Replacing the notations given in FIG. 4, the expression becomes $$y_M = l/k\ (|\dot{\epsilon}| + \alpha/|\dot{x}| + \beta)(\epsilon + \dot{x})$$

where $$k = R53/R60 + R62 + R67$$

The output signal of the pulse width modulator is depicted in FIG. 4. A detailed circuit diagram of multiplier-divider unit is shown in FIG. 4.

As to the function generator circuit, the proportional-integral action of the controller is effected by a combination of impedance elements in the input and feedback loop around the dual MOS FET transistor T3 and amplifier A17. The transfer function of this circuit can be written, taking into account that C11 = C15; $T_F$ = R76C11 and denoting R77 C15/$\omega$ = Ti where $\omega$ changes between 0 and 1 for full travel of the potentiometer P11:

$$Z/y\ (s) = (1/T_F\ s+1) + (1/T_i s)$$

The overall transfer function of the variable structure adaptive controller, assuming that $T_F = 0$ and $\dot{x} = \dot{\epsilon}$, is now in the form $$G(s) = k_1\ (|\dot{\epsilon}| + \alpha/|s\dot{x}| + \beta)\ (1 + (T_d/T_i) + T_d s + (1/T_i s))$$

or $$G(s) = k_1\ (|s\dot{x}| + \beta/|\dot{\epsilon}| + \alpha)\ (1 + (T_d/T_i) + T_d s + (1/T_i s))$$

A detailed diagram of the complete controller's circuit is presented in FIG. 6.

The power supply circuit that is depicted in FIG. 6 is not described since this circuit is not relevant to the subject matter of the invention.

The variable structure adaptive controller has two adjusting points when tuning the controller in a process control loop.

One of these controller settings comprises potentiometers P9, P10 and P11 on the same shaft for tuning control loop stability, and another setting is potentiometer P6 for tuning the quality of controller responses to change in set point or in the presence of disturbances. These two settings are closely connected by the unique procedure of their control setting, so that practically the adaptive controller has only one adjusting point. This means that the controller tuning procedure is enormously simplified, thereby easing the labor of the process control operators.

In FIG. 6 appear some of the details pertaining to the amplifier A8 and the transistor T1, referred to hereinabove and the associated circuitry. More particularly, it is seen that capacitor C2 and C3 are connected in parallel to half of the dual transistor T1 and more particularly to the base 80 thereof. A junction 82 between the capacitors and the transisotr is connected via a diode J6 and potentiometer P6 through a diode J7 and a resistor R22 to ground.

A resistor R25 is connected to the emitter of the aforesaid half of the transistor which is in turn connected to the potentiometer P5, the wiper of which is connected to the transistor T1. A resistor R33 connects a source of positive voltage to the wiper and to the transistor. The other end of the potentiometer P5 is connected by a resistor R27 to the emitter of the second half of the transistor T1. The collectors of the transistor are respectively connected by resistors R26 and R28 to ground.

The base of transistor T1 is connected by resistor R34 to a junction 84 which is connected by resistors R40 and R41 respectively to ground and to an indicator which is connected to ground.

Figure 7:
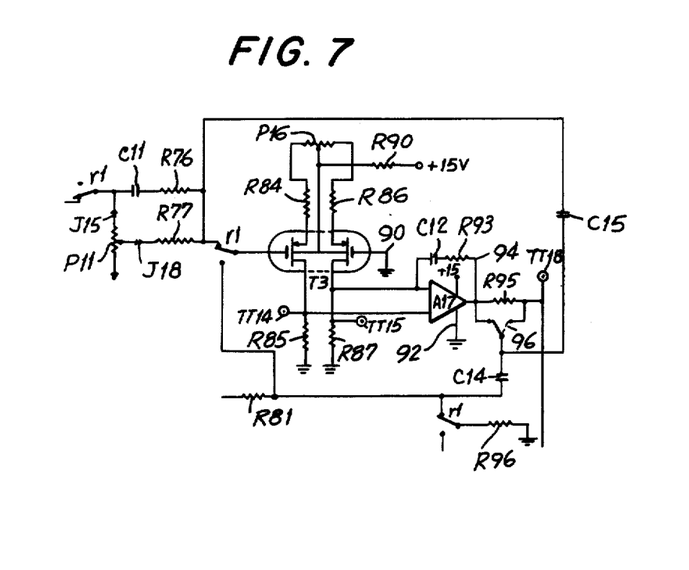
FIG. 7 is a detailed schematic diagram of another part of the adaptive controller circuit.

Inputs to the amplifier A8 are respectively taken from the collectors of the respective halves of the transistor. The output of amplifier A8 is in a feedback loop constituted by capacitor C4 and resistor R35 connected in series. In FIG. 7 are shown some of the details relating to amplifier A17 and transistor T3. The transistor T3 is a dual transistor provided with two bases, two emitters and two collectors. The base of the first half of the transistor is connected to switch R1 in turn connected to resistors R76 and R77. Resistor R76 is connected in series with capacitor C11 whereas resistor R77 is connected to the wiper of potentiometer P11. The potentiometer P11 and capacitor C11 are both connected to another portion of the switch r1.

The emitters of the transistor T3 are connected via resistors R84 and R86 to opposite extremities of potentiometer P16. The wiper of which is connected between the halves of transistor T3 and also via resistor R90 to a source of positive voltage.

The collectors of the transistor T3 are connected via resistors R85 and R87 respectively to ground and to indicators TT14 and TT15. The second half of transistor T3 is grounded via line 90.

The amplifier A17 has a connection to ground via line 92 and has a feedback loop indicated at 94 and including resistor R93 and capacitor C12. The output of amplifier A17 passes through resistor 95 to an indicator TT18 and to a switch indicated at 96. The switch U2 is connected via capacitor C14 and resistor R81 to the prior circuits. A capacitor C15 is connected in feedback relationship to the junction between resistors R76 and R77.

There will now be obvious to those skilled in the art that there has been described above, a variable structure adaptive controller comprising an adaptation circuit working in conjunction with a basic circuit for providing for the adaptation of multiplication coefficients as a function of the derivation values of error signals and the differentials thereof, to provide, in turn, for compensating variations and parameters of apparatus and processes to be controlled.

There will also be obvious to those skilled in the art, many modifications and variations of the circuit set forth hereinabove. These modifications and variations will not depart from the scope of the invention, if defined by the following claims.

What is claimed is:

1. A variable structure adaptive controller for compensating variations of gain and/or time constant parameters of an apparatus or process to be controlled, said controller comprising basic circuit means for the preparation of error information and an error signal and an adaptation circuit means which is coupled to said basic circuit means and provides for the adaptation of multiplication coefficients as a function of the derivation values of the error signal and of the differential of said error signal, said circuit means providing for, in a very wide range of changes in said parameters, compensating the variations of said parameters.

2. A controller as claimed in claim 1 wherein said basic circuit means includes an input terminal, multiplication means coupled to said input terminal, further means providing a function of $TP/\tau P+1$, two output terminals, one of which is connected directly and the other through said further means to said input terminal, and a further output terminal connected to said multiplication means.

3. A controller as claimed in claim 2 wherein said adaptation circuit means includes two parallel circuits connected respectively to said two output terminals and dividing means connecting said circuits to said multiplying means.

4. A controller as claimed in claim 1 wherein said adaptation circuit means comprises first means coupled to said basic circuit means to determine an error signal $\epsilon$ from a standard set signal $x_z$ and a variable signal $x$ generated by the apparatus or process to be controlled.

5. A controller as claimed in claim 4 wherein said adaptation circuit means comprises differentiation means coupled to said first means for generating a signal $x$ representing a derivative of said variable signal.

6. A controller as claimed in claim 5 wherein said adaptation circuit means comprises absolute value circuit means coupled to said first and differentiation means to generate signals $|\epsilon|$ and $|\dot{x}|$ representing absolute values of said error signal and the derivative of said variable signal.

7. A controller as claimed in claim 6 wherein said adaptation circuit means comprises memorizing circuit means coupled to said first and differentiation means to memorize the signals generated by the latter, said memorizing circuit means including means to memorize maximum values $|\hat{x}|$ and $|\hat{\epsilon}|$ of signals received from said differentiation means.

8. A controller as claimed in claim 6 wherein the memorizing circuit means further includes means to establish a time constant for the memorizing circuit means during which said maximum values are memorized.

9. A controller as claimed in claim 8 wherein said adaptation circuit means comprises multiplier-divider means coupled to said memorizing circuit means to operate on the maximum value signals, said multiplier-divider means including a pulse width modulator coupled by said absolute value circuit means to said differentiation means and generating a signal representing a denominator of an adaptation coefficient.

10. A controller as claimed in claim 9 wherein the multiplier-divider means includes an amplitude limiter coupled to said pulse width modulator to generate a signal representing the numerator of said coefficient.

11. A controller as claimed in claim 10 wherein said adaptation circuit means comprises a switch coupled to the amplitude limiter to control the polarity of the output thereof.

12. A controller as claimed in claim 10 wherein the multiplier-divider means is an amplifier-transistor circuit producing a train of pulses having a mean value proportional to $$(|\hat{\epsilon}| + \alpha/|\hat{s}x| + \beta)(\epsilon + T_d sx)$$

wherein
$s$ is a complex Laplace operator
$T_d$ is the time constant of said differentiation means, and
$\alpha$ and $\beta$ are coefficients to correct operation of said multiplier-divider means,
said multiplier-divider means including potentiometers producing voltages representing $\alpha$ and $\beta$.

13. A controller as claimed in claim 12 comprising a function generator means coupled to and receiving the output from said multiplier-divider means and producing an output proportional to $$z \approx k \, (|\epsilon| + \alpha/|sx| + \beta)(1 + (T_d/T_i))\epsilon + T_d \, s \, \epsilon + (\epsilon/T_i s).$$

14. A controller as claimed in claim 12 comprising a function generator means coupled to and receiving the output from said multiplier-divider means and producing an output proportional to $$z \approx k \, (|sx| + \beta/|\epsilon| + \alpha)(1 + T_d/T_i)\epsilon + T_d s \, \epsilon + (\epsilon/T_i s).$$

15. A controller as claimed in claim 13 wherein the function generator means includes a low pass filter.

16. A controller as claimed in claim 15 comprising limiter means coupled to the function generator means to establish maximum and minimum values of the output signal thereof.

17. A controller as claimed in claim 16 wherein the function generator means includes an amplifier-transistor circuit producing an output proportional to $$G(s) = K_1 (|\hat{\epsilon}| + \alpha/|\hat{sx}| + \beta)(1 + (T_d/T_i) + T_d s + (1/T_i s)).$$

18. A controller as claimed in claim 16 wherein the function generator means includes an amplifier-transistor circuit producing an output proportional to $$G(s) = k_1 (|\hat{sx}| + \beta/|\hat{\epsilon}| + \alpha)(1 + (T_d/T_i) + T_d s + 1/T_i s)$$

* * * * *